US012585254B2

(12) United States Patent
Kakeno et al.

(10) Patent No.: US 12,585,254 B2
(45) Date of Patent: Mar. 24, 2026

(54) INDUSTRIAL SYSTEM, ABNORMALITY DETECTION SYSTEM, AND ABNORMALITY DETECTION METHOD

(71) Applicant: Hitachi, Ltd., Tokyo (JP)

(72) Inventors: Nobuhiro Kakeno, Tokyo (JP); Yoshiteru Katsumura, Tokyo (JP); Daiki Kajita, Tokyo (JP); Takahiro Nakano, Tokyo (JP); Miho Arai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 373 days.

(21) Appl. No.: 18/245,557

(22) PCT Filed: Nov. 2, 2020

(86) PCT No.: PCT/JP2020/041118
§ 371 (c)(1),
(2) Date: Mar. 16, 2023

(87) PCT Pub. No.: WO2022/091421
PCT Pub. Date: May 5, 2022

(65) Prior Publication Data
US 2023/0367296 A1 Nov. 16, 2023

(51) Int. Cl.
*G05B 19/418* (2006.01)

(52) U.S. Cl.
CPC ... *G05B 19/4184* (2013.01); *G05B 19/41885* (2013.01); *G05B 2219/31444* (2013.01); *G05B 2219/32019* (2013.01)

(58) Field of Classification Search
CPC .......... G05B 19/4148; G05B 19/41885; G05B 2219/31444; G05B 2219/32019

USPC ......................................................... 700/108
See application file for complete search history.

(56) References Cited

U.S. PATENT DOCUMENTS

2015/0277429 A1 10/2015 Drath et al.
2018/0173243 A1* 6/2018 Park .................... G05D 1/0238
2018/0224841 A1 8/2018 Tani et al.
2019/0317483 A1* 10/2019 Amano ............... H04L 63/1441
(Continued)

FOREIGN PATENT DOCUMENTS

DE 112012007224 T5 10/2015
DE 102019216315 A1 4/2020
(Continued)

OTHER PUBLICATIONS

Japanese Office Action issued on Mar. 26, 2024 for Japanese Patent Application No. 2022-558817.
(Continued)

*Primary Examiner* — Md Azad
(74) *Attorney, Agent, or Firm* — Volpe Koenig

(57) ABSTRACT

This industrial system is characterized by being provided with: a storage unit that stores design data used when constructing an industrial line; a simulation execution unit that executes a simulation of movement of the industrial line, based on the design data; and a detection unit that compares a result of the simulation with the movement of the industrial line during operation and detects an abnormality in components of the industrial line. With such a configuration and movement, the present invention can be utilized for line operation support and high-resolution abnormality detection.

16 Claims, 11 Drawing Sheets

(56) References Cited

U.S. PATENT DOCUMENTS

| | | | |
|---|---|---|---|
| 2020/0130107 A1 | 4/2020 | Mochizuki et al. | |
| 2020/0180651 A1* | 6/2020 | Hayakawa | G07C 5/0808 |
| 2020/0245902 A1* | 8/2020 | Sano | G06F 3/017 |
| 2021/0069900 A1 | 3/2021 | Wittmann | |
| 2021/0181717 A1* | 6/2021 | Mizuno | G05B 19/4155 |
| 2022/0317647 A1* | 10/2022 | Shimakawa | G05B 19/41885 |
| 2022/0404803 A1* | 12/2022 | Sayyarrodsari | G06Q 10/0631 |
| 2023/0038415 A1* | 2/2023 | Satou | G05B 23/0289 |

FOREIGN PATENT DOCUMENTS

| | | | |
|---|---|---|---|
| EP | 3525049 A1 | 8/2019 | |
| JP | 62-282850 A | 12/1987 | |
| JP | 2003-280730 A | 10/2003 | |
| JP | 2009-238102 A | 10/2009 | |
| JP | 2013-073519 A | 4/2013 | |
| JP | 5775803 B2 | 9/2015 | |
| JP | 2017-102620 A | 6/2017 | |
| JP | 2020-095298 A | 6/2020 | |
| WO | 2019113618 A1 | 6/2019 | |

OTHER PUBLICATIONS

International Search Report, PCT/JP2020/041118, Jan. 19, 2021, 5 pgs.

Japanese Office Action issued on Aug. 13, 2024 for Japanese Patent Application No. 2022-558817.

German Office Action issued on Apr. 11, 2025 for German Patent Application No. 112020007421.8.

* cited by examiner

[FIG. 1]
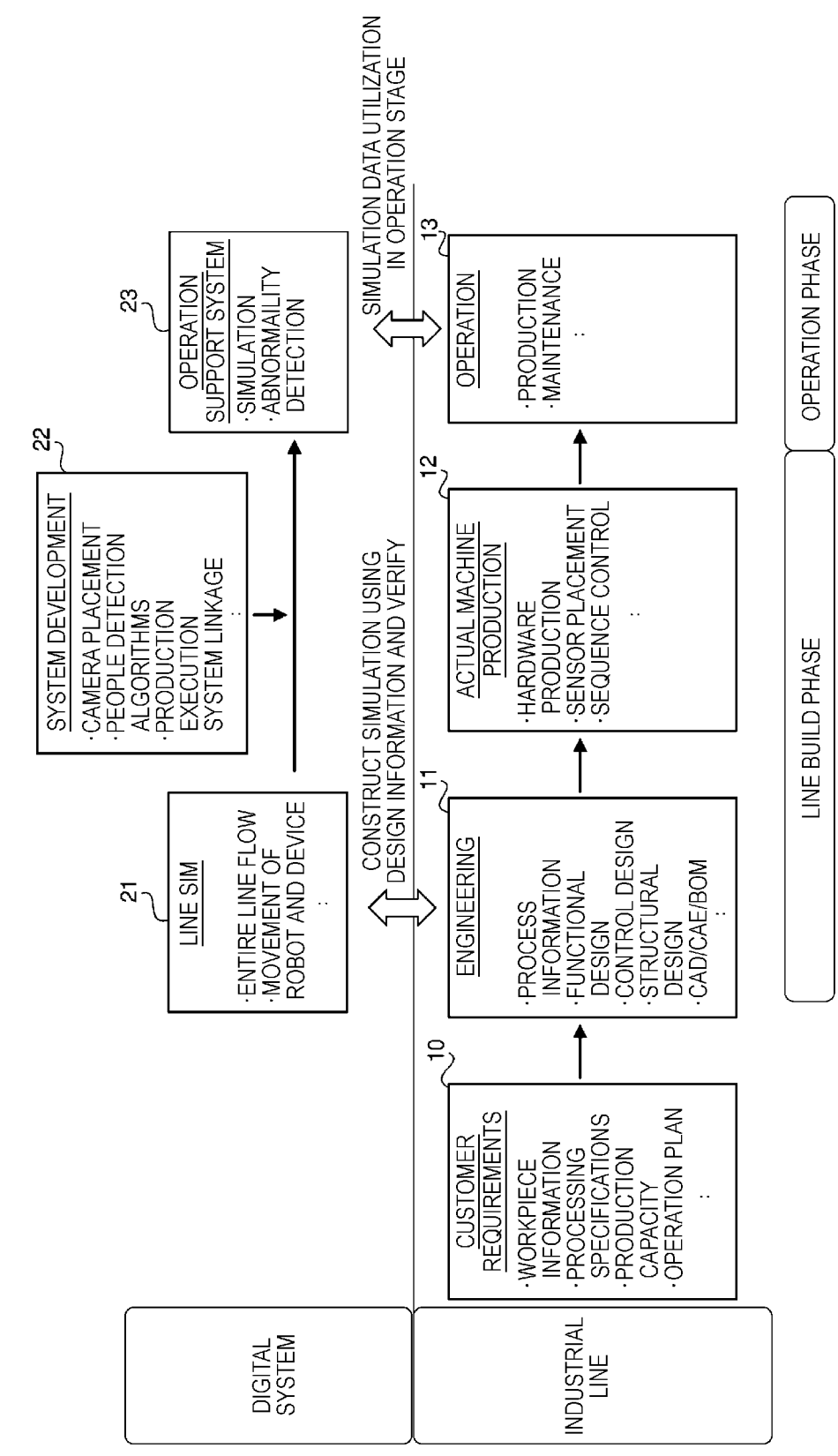

[FIG. 2]
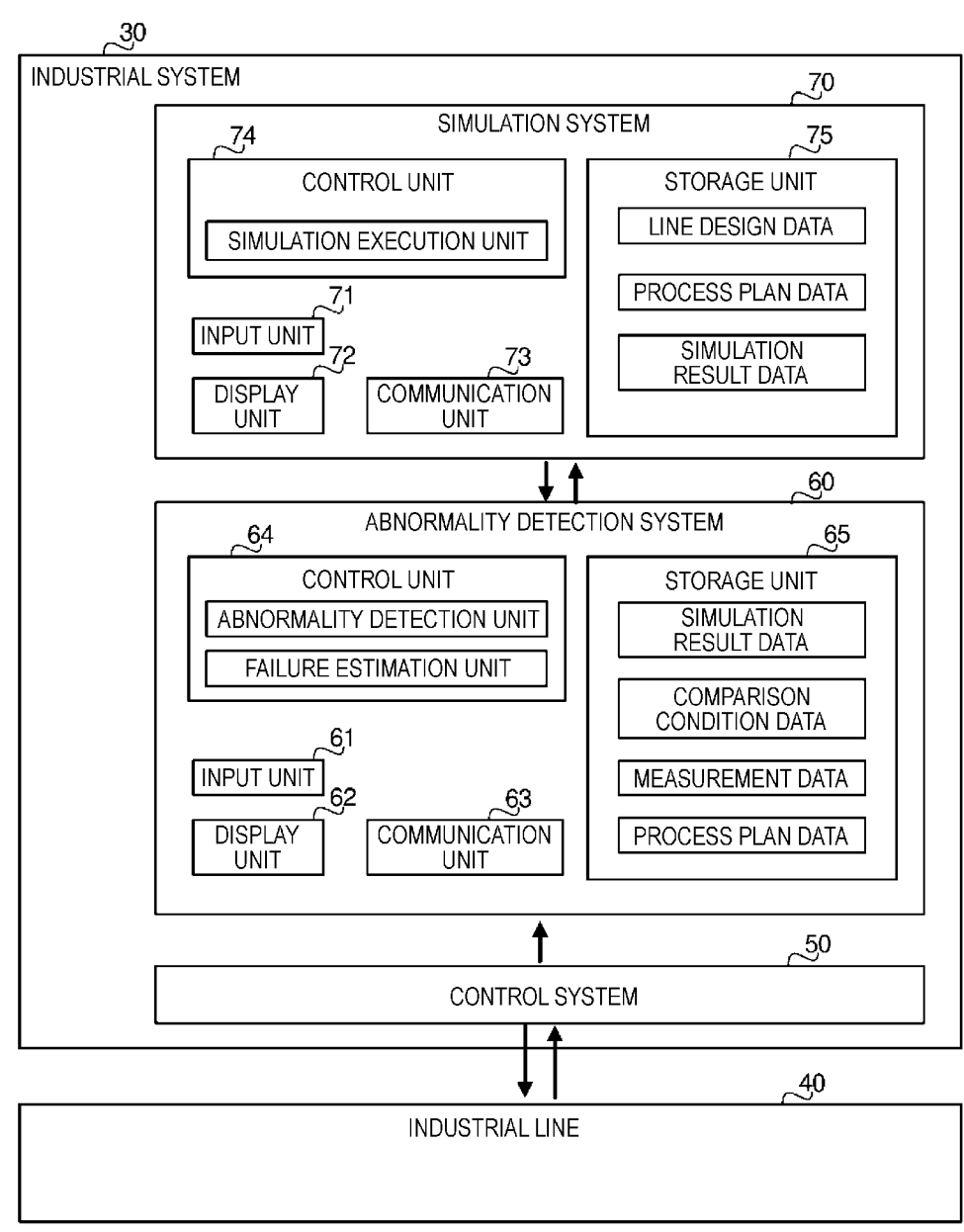

[FIG. 3]
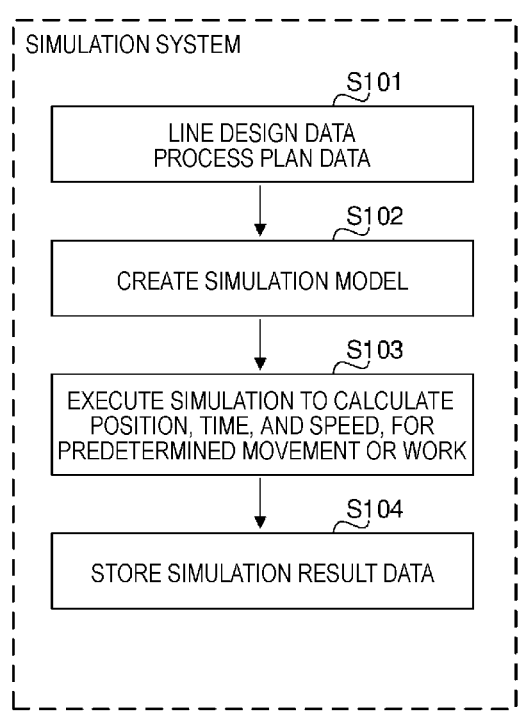
DURING SIMULATION EXECUTION
SIMULATION SYSTEM
S101
LINE DESIGN DATA
PROCESS PLAN DATA
S102
CREATE SIMULATION MODEL
S103
EXECUTE SIMULATION TO CALCULATE
POSITION, TIME, AND SPEED, FOR
PREDETERMINED MOVEMENT OR WORK
S104
STORE SIMULATION RESULT DATA

[FIG. 4]
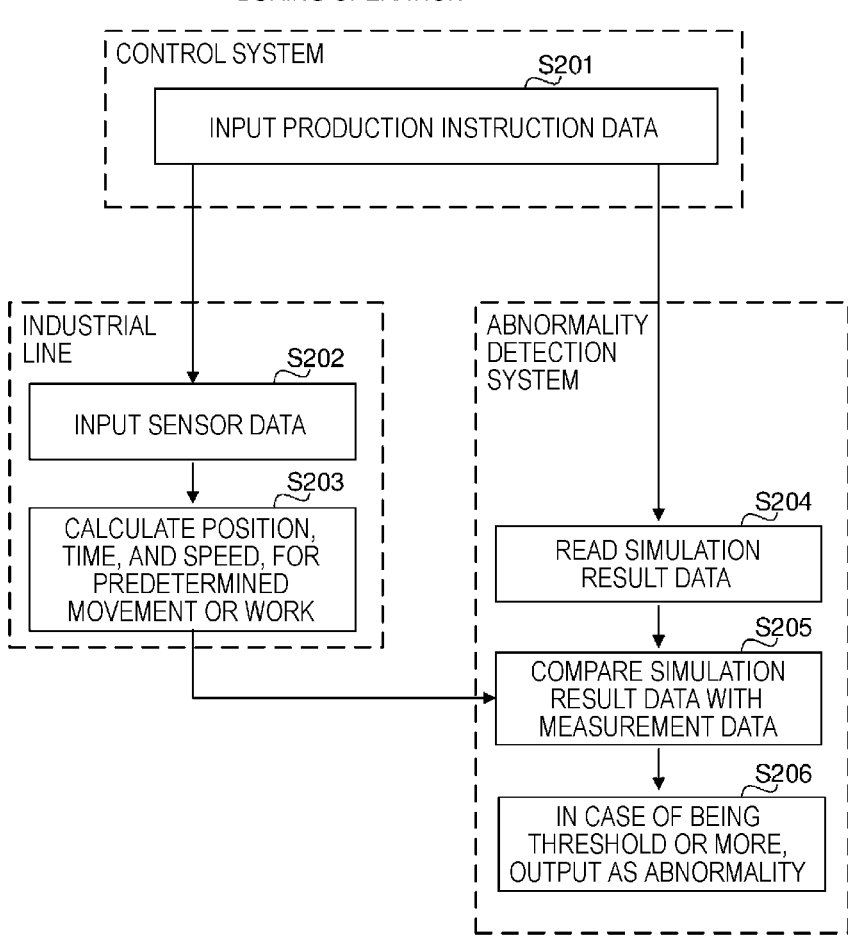
DURING OPERATION
CONTROL SYSTEM                                    S201
INPUT PRODUCTION INSTRUCTION DATA
INDUSTRIAL LINE                    S202
INPUT SENSOR DATA
S203
CALCULATE POSITION, TIME, AND SPEED, FOR PREDETERMINED MOVEMENT OR WORK
ABNORMALITY DETECTION SYSTEM
S204
READ SIMULATION RESULT DATA
S205
COMPARE SIMULATION RESULT DATA WITH MEASUREMENT DATA
S206
IN CASE OF BEING THRESHOLD OR MORE, OUTPUT AS ABNORMALITY

[FIG. 5]

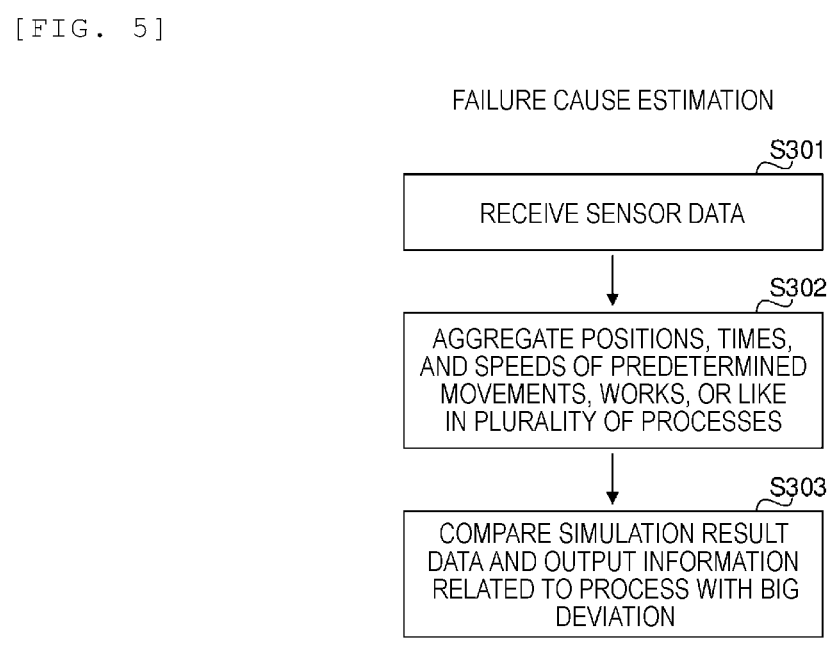

FAILURE CAUSE ESTIMATION

S301

| RECEIVE SENSOR DATA |
| --- |

S302

| AGGREGATE POSITIONS, TIMES, AND SPEEDS OF PREDETERMINED MOVEMENTS, WORKS, OR LIKE IN PLURALITY OF PROCESSES |
| --- |

S303

| COMPARE SIMULATION RESULT DATA AND OUTPUT INFORMATION RELATED TO PROCESS WITH BIG DEVIATION |
| --- |

[FIG. 6]

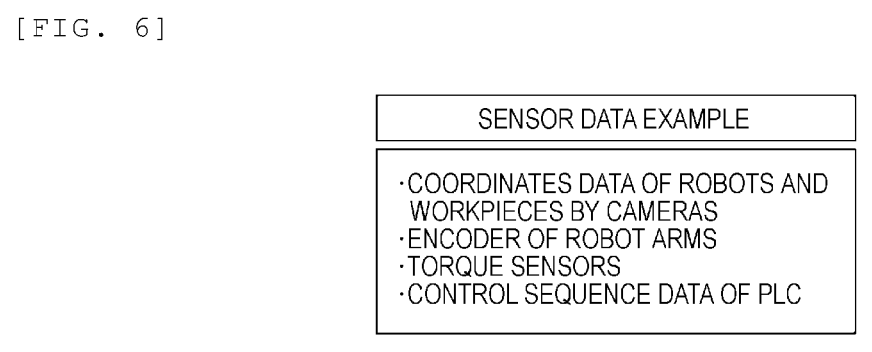

| SENSOR DATA EXAMPLE |
| --- |
| ·COORDINATES DATA OF ROBOTS AND<br>  WORKPIECES BY CAMERAS<br>·ENCODER OF ROBOT ARMS<br>·TORQUE SENSORS<br>·CONTROL SEQUENCE DATA OF PLC |

[FIG. 7]
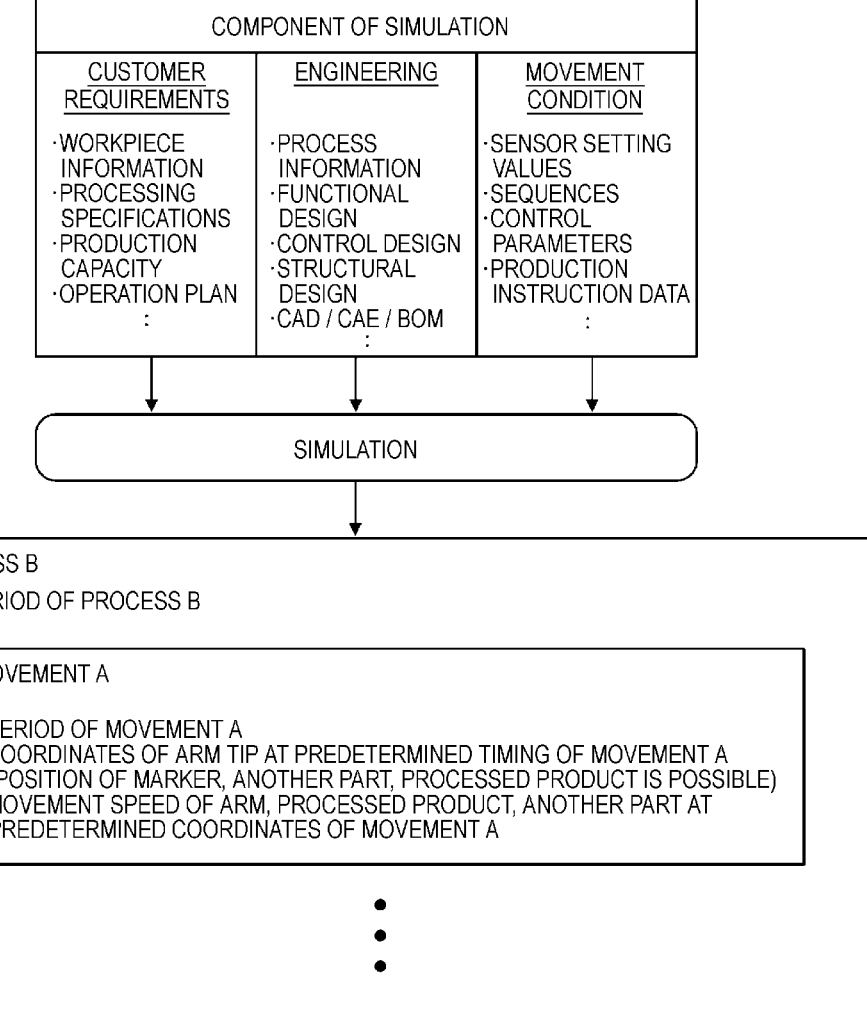

[FIG. 8]
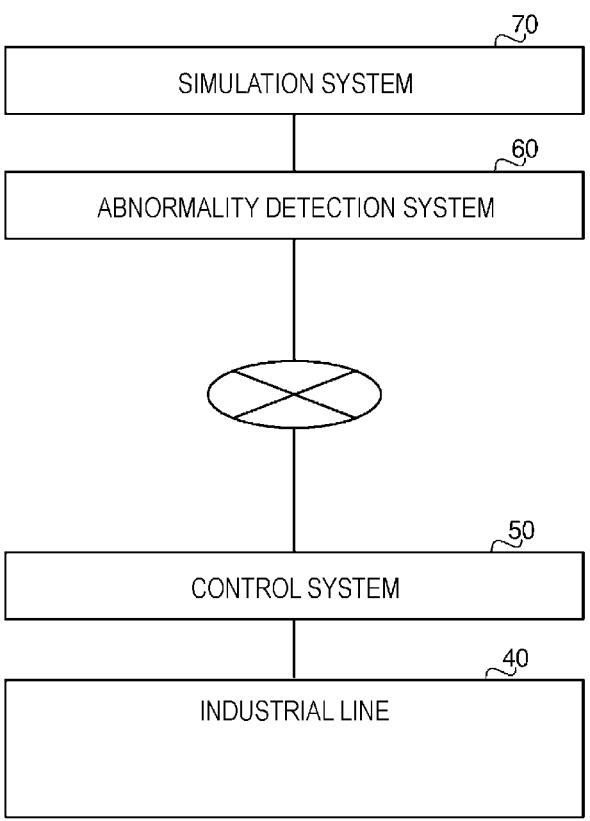

[FIG. 9]
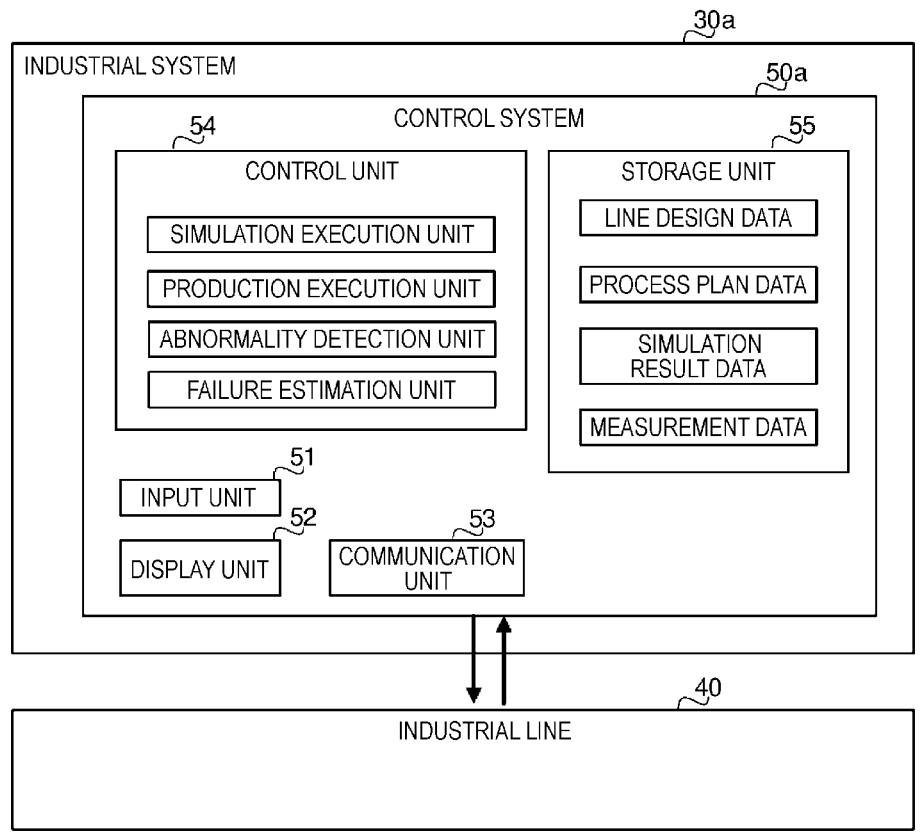

[FIG. 10]
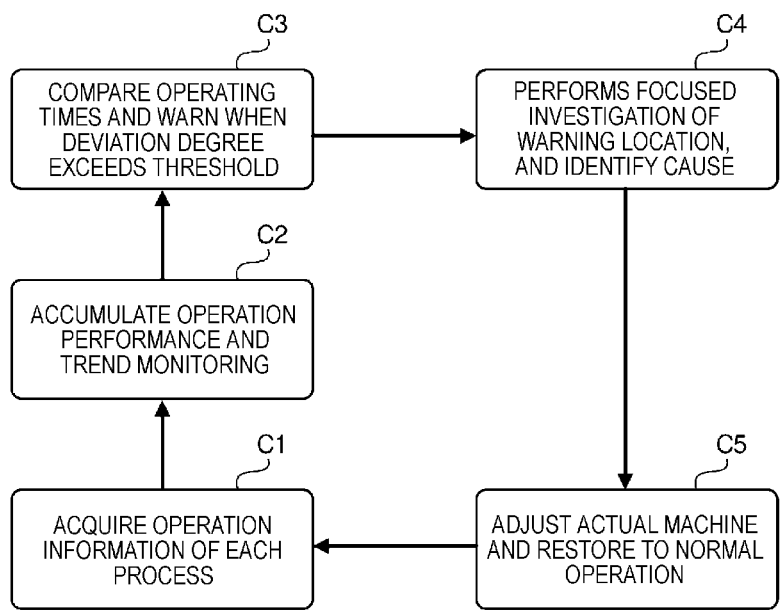

[FIG. 11]
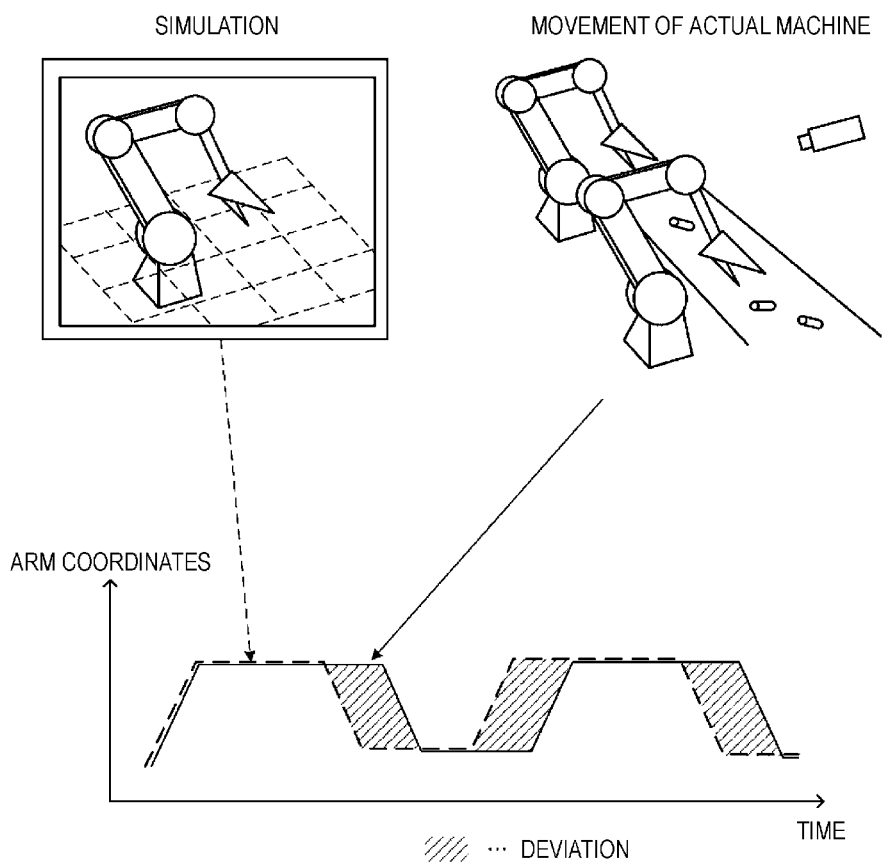

INDUSTRIAL SYSTEM, ABNORMALITY DETECTION SYSTEM, AND ABNORMALITY DETECTION METHOD

TECHNICAL FIELD

The present invention relates to an industrial system, an abnormality detection system, and an abnormality detection method.

BACKGROUND ART

PTL 1 describes a manufacturing line evaluation support method including: a simulation result data input process of collecting simulation result data of each element of a manufacturing line configured on a virtually designed simulator and transmitting the collected simulation result data to an evaluation support device side; a data organizing process of importing the collected simulation result data and organizing the data into a format in accordance with the operating rate, production volume, and evaluation index; and a problem analysis process of evaluating the simulation result data, using pre-stored evaluation rules consisting of evaluation items, evaluation reference values, and an evaluation flow for result data for each manufacturing line type, and extracting problems related to manufacturing line components.

PTL 2 describes a manufacturing line simulation model construction method including: a step of constructing a prediction formula that approximately predicts the lead time of each process, from a result of simulation performed in the past or an actual production result; a step of calculating, for each process, an error between the prediction formula and the simulation performed in the past, or an error between the prediction formula and the actual production result; a step of determining a process to which a simplified simulation using the prediction formula is applied, based on information on the calculated error for each process; and a step of executing a manufacturing line simulation to which a process lead time using the prediction formula is applied, in the process determined to apply the simplified simulation.

CITATION LIST

Patent Literature

PTL 1: JP2003-280730A
PTL 2: JP5775803B

SUMMARY OF INVENTION

Technical Problem

The line simulation models in the related art are difficult to apply to applications that require more detailed information than productivity evaluations and line configuration evaluations, and to construct models for such purposes.

Thus, an object of the present invention is to provide a system and a method that can be utilized for line operation support and high-resolution abnormality detection by using a line simulator for design verification.

Solution to Problem

In order to achieve the above object, one of representative industrial systems of the present invention includes: a storage unit that stores design data used when constructing an industrial line; a simulation execution unit that executes a simulation of movement of the industrial line, based on the design data; and a detection unit that compares a result of the simulation with the movement of the industrial line during operation and detects an abnormality in components of the industrial line.

Further, one of representative industrial systems of the present invention is an industrial system including: a sensor that acquires information on industrial device; and calculation means for performing calculation based on the information acquired by the sensor, in which the sensor acquires information on a movable part of the industrial device, the information including one or more among position information, speed information, and acceleration information of the movable part, during operation of the industrial device, and the calculation means performs a process of comparing the information on the movable part acquired by the sensor with information on a virtual movable part obtained through a simulation for the industrial device, and outputting a result of the comparison process.

Further, one of representative industrial systems of the present invention includes: a storage unit that stores design data used when constructing an industrial line including a plurality of processes; a simulation execution unit that executes a simulation of movement of the industrial line, based on the design data; and a detection unit that compares a relationship between a plurality of virtual processes in a result of the simulation and a relationship between the plurality of processes during operation of the industrial line, and detects an abnormality in the industrial line.

One of representative industrial systems of the present invention includes: a simulation execution step of executing a simulation of movement of an industrial line, based on design data used when constructing the industrial line; an information acquisition step of acquiring information indicating movement of the industrial line during operation; and a detection step of comparing a result of the simulation with movement of the industrial line during operation and detecting an abnormality in components of the industrial line.

Advantageous Effects of Invention

The present invention can be utilized for line operation support and high-resolution abnormality detection. Problems, configurations, and effects other than those described above will be clarified by the following description of the embodiment.

BRIEF DESCRIPTION OF DRAWINGS

FIG. 1 is an explanatory diagram of an industrial system and abnormality detection according to the present invention.

FIG. 2 is a configuration diagram of the industrial system.

FIG. 3 is a flowchart showing a processing procedure when executing a simulation.

FIG. 4 is a flowchart showing a processing procedure during operation.

FIG. 5 is a flowchart showing a processing procedure for estimating failure causes.

FIG. 6 is an explanatory diagram of a specific example of sensor data.

FIG. 7 is an explanatory diagram of simulation.

FIG. 8 is a modification example of the configuration of the industrial system.

FIG. 9 is an explanatory diagram of a configuration for causing a control system to perform simulation and abnormality detection.

FIG. 10 is an explanatory diagram of the overall movement of the industrial system.

FIG. 11 is an explanatory diagram of abnormality detection.

DESCRIPTION OF EMBODIMENTS

An embodiment of the present invention will be described below with reference to the drawings. It should be noted that the embodiment described below does not limit the invention according to the claims, and that all of the elements described in the embodiment and their combinations are not necessarily essential as solutions of the invention.

In the following description, identification numbers are used as identification information of various objects, but identification information of types other than identification numbers (for example, identifiers including alphabetic characters and symbols) may be employed.

Further, in the following description, when describing the same type of elements without distinguishing between the elements, reference symbols (or common symbols among the reference symbols) are used, and when describing the same type of elements separately, the identification number (or reference symbol) of the element may be used.

EMBODIMENT

FIG. 1 is an explanatory diagram of an industrial system and abnormality detection according to the present invention. The lines shown in FIG. 1 is an industrial line that carries out the manufacture of articles, the transportation of articles represented by material handling, and the like. Here, an industrial line is a facility that performs the manufacturing of objects and material handling (including processing, assembly, painting, inspection, transportation, sorting, picking, palletizing, storage, or the like) by sequentially executing prescribed processes. In other words, lines that include not only manufacturing lines and production lines, but also lines that carries out transportation and the like are referred to as industrial lines. Further, in the present embodiment, industrial device is included as a component of the industrial line. The industrial device has a movable part such as an arm, and performs manufacturing, material handling, and the like by controlling the movement of the movable part. In addition, the industrial device includes a linkage mechanism having a plurality of actuators, a mechanism having self-propelled means and gripping means with chucks and clamps, conveying means such as hoists, conveyors, and cranes, movable bodies that perform position control by linear rails and ball screws, rotating bodies that control angle and acceleration, motors, inverters, compressors, or the like.

When constructing an industrial line, the line builder responsible for constructing the line performs engineering such as designing, based on the requirements of the customer who requested the construction of the line. The customer requirements 10 include, for example, workpiece information, processing specifications, production capacity, operation plan, or the like, regarding target articles. Engineering 11 includes process information, functional design, control design, structural design, computer aided design (CAD), computer aided engineering (CAE), bills of materials (BOM), or the like.

After engineering 11, actual machine production 12 is performed on the industrial line, and then industrial line operation 13 is performed. The actual machine production 12 includes hardware production, sensor placement, sequence control, and the like. The operation 13 includes production of target articles, line maintenance, and the like.

Of these, the engineering 11 and the actual machine production 12 are called a line build phase, and the operation 13 is called an operation phase.

In engineering 11 of the line build phase, a simulation model is constructed from the design information and verified by simulation. This line simulation 21 can virtually determine the entire line flow and the movements of industrial device including robots and devices, and can verify whether desired movements can be implemented.

In the related art, this simulation model for design verification is mainly used for movement verification in the line build phase by the created line SIer. The present invention develops this simulation and implements an operation support system 23 that is utilized in the operation stage.

Specifically, the operation support system 23 uses various types of design information used during line construction (line build phase) as design data, executes operation phase simulations based on design data and operation information obtained in production and maintenance, and compares the simulation result with the actual movement of the line during operation to detect abnormalities in the components of the line. Here, the term "abnormality" includes not only something actually occurring in industrial device or industrial lines, but also signs of abnormalities. It is possible to detect or identify signs of an abnormality, by changing a value for identifying or determining an abnormality, a threshold value for the difference between predetermined movements of the actual machine and the simulation, and the like, which will be described later.

In the simulation, the operation support system 23 calculates the position information, speed information, and acceleration information of the movable parts of the industrial device using the shape or the like of the industrial device identified by the design data, thereby obtaining information about the virtual movable parts. For the simulation, it is possible to refer not only to the shape of the identified industrial device, but also to data sheets or the like provided by industrial device manufacturers.

On the other hand, the operation support system 23 calculates the position information, speed information, and acceleration information of the movable parts of the industrial device during operation by using the sensors provided on the line and information output by the industrial device, thereby obtaining information about the actual movable parts.

As a result of comparing the information on the actual movable part and the information on the virtual movable part, if there is a deviation exceeding a predetermined range, the operation support system 23 detects that an abnormality has occurred and outputs a warning. For example, if the time required for the actual movable part to perform a predetermined movement is longer than the time required for the predetermined movement on the simulation, and the difference exceeds a threshold value, it is detected that an abnormality has occurred.

Sensors and outputs provided for other purposes can be used as the sensors and outputs for acquiring information on the actual movable parts. Additional sensors may be added to detect the abnormalities described above. For example, it is preferable to newly dispose a camera, image the movable part, and identify the position, speed, and acceleration of the movable part. At this time, the state of the movable part can be accurately detected by identifying the vicinity of the tip of the movable part. The vicinity of the tip is an area from the tip to a predetermined position, or an area from the first predetermined position to the second predetermined position excluding the tip. This is effective when the tip itself cannot be detected by the camera. Further, when a marker is attached to the movable part to identify the marker, the state of the movable part can be easily identified. By attaching a marker and storing the distance from the marker to the actual tip position in the storage means, the tip position that is difficult to detect with a camera can be identified by calculation, and more accurate information on the movable part can be obtained. It is also possible to combine the direct detection of the vicinity of the tip by the camera with the detection of the marker. In this case, it is effective when detecting a movable body whose marker is hidden by a rotating body.

In system development 22, the entire system is constructed such that information used for the movement of the operation support system 23 can be acquired, by performing placement of cameras for detection, algorithms for detecting people, and linking with a system that executes production, based on the line simulation 21 for line build.

FIG. 2 is a configuration diagram of an industrial system. As shown in FIG. 2, the industrial system 30 includes a control system 50, an abnormality detection system 60, and a simulation system 70. The control system 50 acquires various types of information from the industrial line, and controls the movement of the industrial line.

The simulation system 70 is a computer, for example, and includes an input unit 71, a display unit 72, a communication unit 73, a control unit 74 and a storage unit 75.

The input unit 71 is a keyboard, a mouse, or the like.

The display unit 72 is a liquid crystal display or the like.

The communication unit 73 is a communication interface that communicates with the abnormality detection system 60 and the like.

The control unit 74 implements various functions, by an arithmetic unit such as a central processing unit (CPU) executing a predetermined program. In particular, in the present embodiment, the control unit 74 implements the function as a simulation execution unit.

The storage unit 75 is a magnetic storage device, a flash memory, or the like, and stores line design data, process plan data, simulation result data, and the like.

The control unit 74 executes a simulation using the line design data and the process plan data stored in the storage unit 75 to obtain a virtual movement of the industrial line 40 and generate simulation result data.

The control unit 74 stores the simulation result data in the storage unit 75 and transmits the data to the abnormality detection system 60.

When the design of the industrial device on the industrial line 40 is changed, the line design data in the storage unit 75 is updated, the control unit 74 executes the simulation again, and the simulation result data in the storage unit 75 and the abnormality detection system 60 is updated, so that the simulation result data in the storage unit 75 is updated and transmitted to the abnormality detection system 60 again. Therefore, the simulation result data reflects the latest state of the industrial line 40.

The abnormality detection system 60 is a computer, for example, and includes an input unit 61, a display unit 62, a communication unit 63, a control unit 64, and a storage unit 65.

The input unit 61 is a keyboard, a mouse, or the like.

The display unit 62 is a liquid crystal display or the like. A tablet terminal in which the display unit 62, the input unit 61, and the communication unit 62 are integrated can be used, and input/output and communication can be performed through the touch panel. In this case, it is preferable that the control unit 64 and the storage unit 65 are separated from each other for convenience of calculation processing.

The communication unit 63 is a communication interface that communicates with the simulation system 70, the control system 50, and the like.

The control unit 64 implements various functions, by an arithmetic unit such as a central processing unit (CPU) executing a predetermined program. In particular, in the present embodiment, the control unit 64 implements functions as an abnormality detection unit and a failure estimation unit. That is, the control unit 64 corresponds to the calculation means in the claims.

The storage unit 65 is a magnetic storage device, a flash memory, or the like, and stores simulation result data, comparison condition data, measurement data, process plan data, and the like. The simulation result data in the storage unit 65 is data received from the simulation system 70. The measurement data in the storage unit 65 is data received from the control system 50 and indicates outputs of various sensors of the industrial line 40 and the like.

The control unit 64 operates as the abnormality detection unit, by comparing the information on the virtual movable part indicated by the simulation result data with the information on the actual movable part indicated by the measurement data, and issuing a warning when the deviation deviates from a predetermined range. The conditions for comparing the simulation result data and the measurement data are shown in comparison condition data.

Further, the control unit 64 operates as a failure cause estimation unit that estimates the cause of the failure, by detecting the movements of the components of the industrial line that is the cause of the abnormality when the abnormality is detected by the abnormality detection unit.

FIG. 3 is a flowchart showing a processing procedure when executing a simulation. The simulation system 70 first acquires line design data and process plan data (step S101), and creates a simulation model (step S102). After that, the simulation system 70 executes a simulation of the industrial line to calculate the position, time, and speed of a predetermined movement or work of the entire industrial line or the computer of the industrial device (step S103). That is, the information of the virtual movable part is calculated, and the calculation result is stored in the storage unit. The control unit 74 stores the simulation result data in the storage unit 75 (step S104), and ends the process. The stored simulation result data is transmitted to the abnormality detection system 60 at any timing. Note that the simulation model may be created in advance in the storage unit, and may be read from the storage device in step S102.

FIG. 4 is a flowchart showing a processing procedure during operation. During operation, first, the control system 50 inputs production instruction data (step S201), operates the industrial line 40, and causes the abnormality detection system 60 to start abnormality detection.

The industrial line 40 inputs sensor data while operating the line (step S202), and calculates the position, time, and speed of a predetermined movement, work, or the like (step S203). The calculation result of the industrial line 40 is transmitted to the abnormality detection system 60 as measurement data indicating information on the actual movable part.

The abnormality detection system 60 reads the simulation result data (step S204), and compares the measurement data received from the industrial line 40 with the simulation result data (step S205). As a result of the comparison, when the deviation is equal to or greater than the threshold, the abnormality detection system 60 outputs that an abnormality has occurred (step S206), and ends the process. In other words, when there is a difference between the movement of the virtual movable part that is ideal movement and the movement of the movable part of the actual machine, it is considered that there is some abnormality or symptom of an abnormality in the actual machine, so that it becomes possible to notify the user or the administrator before a big trouble occurs in the industrial line.

FIG. 5 is a flowchart showing a processing procedure for estimating failure causes. The failure cause estimation is performed by the failure estimation unit of the abnormality detection system 60, when the abnormality detection unit of the abnormality detection system 60 detects an abnormality. For example, when an abnormality occurs in the entire industrial line 40, such as a decrease in the throughput of the industrial line 40, it is used to estimate the cause.

Specifically, the abnormality detection system 60 receives input of measurement data acquired from the industrial line 40 (step S301), and aggregates positions, times, and speeds of predetermined movements, works, or the like in a plurality of processes (step S302). For each processes the abnormality detection system 60 compares the calculated information of the actual movable part with the simulation result for each process. Then, information about the process with a large deviation is output (step S303).

According to this failure cause estimation, even if the deviation from the simulation result does not exceed the threshold, it is possible to estimate the process that caused the abnormality by relatively comparing the information of a plurality of processes. For example, when an abnormality is detected in a series of processes involving movements A, B, and C, it is possible to identify and estimate the movement with the largest separation and the mode with the largest separation (axis corresponding to the movement axis of the robot and the rotation axis of the actuator), by comparing movement times corresponding to respective movements calculated based on the simulation results and sensor detection values for each of the movements A, B, and C.

FIG. 6 is an explanatory diagram of a specific example of sensor data. As shown in FIG. 6, as sensor data, position data of robots and workpieces identified by cameras, encoder outputs of robot arms, control sequence data for torque sensors, programmable logic controllers (PLCs), industrial PCs (IPCs), and IoT controllers, or the like can be used. As the sequence data, ladder diagram, structured text (ST), instruction list (IL), sequential function chart (SFC), or the like can be read.

FIG. 7 is an explanatory diagram of simulation. Customer requirement data, engineering data, operating condition data, and the like are used for the components of the simulation. The customer requirement data includes workpiece information, processing specifications, production capacity, operation plan, or the like. The engineering data includes process information, functional design, control design, structural design, CAD/CAE/BOM, and the like. The operating condition data includes sensor setting values, sequences, control parameters, production instruction data, and the like.

Through the simulation performed using these pieces of data as components, it is possible to obtain the period of a predetermined movement A, coordinates of the tip of an arm at the predetermined timing of the movement A (the position of a marker, another part, or a processed product may be used), the movement speed of an arm or the like (including a processed product and another part) at predetermined coordinates of the movement A. Further, the time required for the process B including the movement A, for example, can also be obtained as a result of the simulation.

FIG. 8 is a modification example of the configuration of the industrial system. The industrial system shown in FIG. 8 differs from the system shown in FIG. 2 in that a network is interposed between the control system 50 and the abnormality detection system 60. In this configuration, the abnormality detection system 60 and the simulation system 70 may be separated from the industrial line 40 and may be implemented as cloud services.

FIG. 8 shows a modification example in which a network is interposed between the control system 50 and the abnormality detection system 60, but a modification example in which a network is interposed between the abnormality detection system 60 and the simulation system 70 is also possible.

FIG. 9 is an explanatory diagram of a configuration for causing a control system to perform simulation and abnormality detection. In FIG. 9, an industrial system 30*a* includes a control system 50*a*. The control system 50*a* acquires various types of information from the industrial line 40, and controls the movement of the industrial line.

The control system 50*a* is a computer, for example, and includes an input unit 51, a display unit 52, a communication unit 53, a control unit 54, and a storage unit 55.

The input unit 51 is a keyboard, a mouse, or the like.

The display unit 52 is a liquid crystal display or the like.

The communication unit 53 is a communication interface that communicates with other devices.

The control unit 54 implements various functions, by an arithmetic unit such as a central processing unit (CPU) executing a predetermined program. In particular, in the present embodiment, the control unit 54 implements functions as a simulation execution unit, a production execution unit, and an abnormality detection unit.

The storage unit 55 is a magnetic storage device, a flash memory, or the like, and stores line design data, process plan data, simulation result data, measurement data, and the like.

The control unit 54 operates as a simulation execution unit, by executing a simulation using the line design data and the process plan data stored in the storage unit 55 to obtain virtual movement of the industrial line 40 and generate simulation result data.

Further, the control unit 54 operates as a production execution unit, by acquiring sensor output from the industrial line 40 to generate measurement data, and controlling the movement of the industrial line 40.

Further, the control unit 54 operates as the abnormality detection unit, by comparing the information on the virtual movable part indicated by the simulation result data with the information on the actual movable part indicated by the measurement data, and issuing a warning when the deviation deviates from a predetermined range.

FIG. 10 is an explanatory diagram of the overall movement of the industrial system. As shown in FIG. 10, the industrial system 30 (including the industrial system 30 shown in FIG. 1 or the like and the industrial system 30*a* shown in FIG. 9) cyclically executes C1 to C5. In C1, the industrial system 30 acquires operation information of each configuration. In C2, the industrial system 30 accumulates operation performance and monitors trends. In C3, the industrial system 30 compares operating times and warns if the deviation degree exceeds a threshold. In C4, the industrial system 30 performs focused investigation of the warning location, and identifies the cause of the abnormality. In C5, the industrial system 30 adjusts the actual machine and restores to normal operation.

FIG. 11 is an explanatory diagram of abnormality detection. In FIG. 11, the temporal change of the coordinates of the arm tip obtained by the simulation is displayed as a dashed line on the graph. Further, the temporal change of the coordinates of the arm tip that is imaged with the camera and identified is displayed as a solid line on the graph. For convenience of explanation, the coordinates of the arm are shown for only one dimension. Further, in FIG. 11, the deviation between the simulation result and the identification result by the camera is shown as a shaded area.

In this way, by superimposing the simulation result and the identification result on the same graph, it is possible to clearly show the deviation between the results.

As a criterion for detecting abnormality recorded as comparison condition data, it is also possible to compare the distances of the coordinates reached when a predetermined part of the arm performs a predetermined movement on the simulation result and the actual machine. Further, it is also possible to compare with the movement speed during a predetermined movement. Further, for example, in a series of processes from the start of a predetermined movement of a robot arm A on articles to the completion of the movement, the conveyance of the articles, and the completion of the predetermined movement of a robot arm B, it is also possible to compare with the positions and arrival times of the articles to be processed or conveyed.

As described above, in the present embodiment, the industrial system 30 includes a storage unit 65 that stores design data used when constructing an industrial line, a control unit 74 functioning as a simulation execution unit that executes a simulation of movement of the industrial line, based on the design data, and a control unit 64 functioning as a detection unit that compares a result of the simulation with the movement of the industrial line during operation and detects an abnormality in components of the industrial line.

With such a configuration and movement, the industrial system 30 can be utilized for line operation support and high-resolution abnormality detection.

Further, in an industrial system 30 including: a sensor that acquires information on industrial device; and calculation means for performing calculation based on the information acquired by the sensor, in which the sensor acquires information on a movable part of the industrial device, the information including one or more among position information, speed information, and acceleration information of the movable part, during operation of the industrial device, and the calculation means performs a process of comparing the information on the movable part acquired by the sensor with information on a virtual movable part obtained through a simulation for the industrial device, and outputting a result of the comparison process.

Further, in the industrial system 30, the simulation is performed based on design data used for designing the industrial device.

With such a configuration and movement, the industrial system 30 can utilize the simulation at the time of line construction during operation, and can perform operation support and abnormality detection.

Further, in the industrial system 30, when there is a deviation exceeding a predetermined range for the movement time of the movable part, as a result of comparing information of the movable part acquired by the sensor with information of the virtual movable part, the calculation means outputs a warning.

Further, the sensor is characterized in that the sensor acquires the information by identifying a vicinity of a tip of the movable part.

The sensor may be imaging means, and may acquire the information by identifying a marker attached to the movable part.

With such a configuration and movement, it is possible to easily acquire information on the movable part, and to acquire abnormalities and symptoms of abnormalities in the actual device by comparison with simulations that have not been used in the related art.

Further, the industrial device configures at least part of a manufacturing line, and the simulation is a simulation using computer-aided design data at the time of designing the manufacturing line. Therefore, it is possible to directly utilize the data used for designing the manufacturing line.

Further, when the design of the industrial device is changed, the simulation result data is updated, so that it is possible to adapt to the latest state and accurately detect abnormalities.

Further, by executing a simulation of movement of an industrial line, using design data used when constructing an industrial line including a plurality of processes, comparing a relationship between a plurality of virtual processes in a result of the simulation and a relationship between the plurality of processes during operation of the industrial line, and detecting an abnormality in the industrial line, it is possible to estimate a location that is relatively likely to be the cause of the abnormality.

It should be noted that the present invention is not limited to the above-described embodiment, and various modification examples are included. For example, the above-described embodiment has been described in detail in order to explain the present invention in an easy-to-understand manner and is not necessarily limited to those having all the configurations described. Further, not only deletion of such a configuration but also replacement and addition of the configuration are possible.

Further, each of the above-described configurations, functions, processing units, processing means, and the like may be partially or entirely implemented by hardware, for example, by designing an integrated circuit. The present invention can also be implemented by software program code that implements the functions of the embodiment. In this case, a computer is provided with a storage medium recording the program code, and a processor included in the computer reads the program code stored in the storage medium. In this case, the program code itself read from the storage medium implements the functions of the above-described embodiment, and the program code itself and the storage medium storing it configure the present invention. As examples of storage media for supplying such program code, flexible disks, CD-ROMs, DVD-ROMs, hard disks, Solid State Drives (SSDs), optical disks, magneto-optical disks, CD-Rs, magnetic tapes, nonvolatile memory cards, ROMs, or the like are used.

Further, the program code that implements the functions described in the present embodiment can be implemented in a wide range of programs or script languages, such as assembler, C/C++, perl, Shell, PHP, and Java (registered trademark).

In the above-described embodiment, the control lines and the information lines which are considered to be necessary for the explanation are indicated, and not all control lines and information lines are necessarily indicated on the product. All configurations may be interconnected.

REFERENCE SIGNS LIST

30: industrial system
40: industrial line
50: control system
60: abnormality detection system
61, 71: input unit
62, 72: display unit
63, 73: communication unit
64, 74: control unit
65, 75: storage unit
70: simulation system

The invention claimed is:

1. An industrial system for line operation support and high-resolution abnormality detection, the industrial system comprising:

a storage unit that stores design data used to construct an industrial line;

a simulation execution unit that executes a simulation of movement of the industrial line, based on the design data;

a detection unit that compares a result of the simulation with movement of the industrial line during operation and detects an abnormality in components of the industrial line, wherein the abnormality comprises one or more of a first event occurring in an industrial device of the industrial line, a second event occurring on the industrial line, an indication the first event or the second event, and a threshold value for a difference between predetermined movements of the industrial line during the operation or the industrial device and the simulation, and a calculation unit that generates and outputs a graph for display, the graph superimposing the simulation and the predetermined movements to show the abnormality between the simulation and the predetermined movements.

2. The industrial system according to claim 1, wherein the industrial line includes a plurality of industrial devices, the simulation execution unit executes a simulation of a series of processes by the plurality of industrial devices, and the detection unit compares data based on a measurement result of a sensor installed in the industrial line with data based on a result of the simulation of the series of processes, and outputs a comparison result.

3. The industrial system according to claim 1, further comprising:

a failure cause estimation unit that compares data indicating the result of the simulation of the industrial line with data based on a measurement result of a sensor installed in the industrial line, and detects movement of a component of the industrial line that is a cause when it is determined to be abnormal.

4. An industrial system for line operation support and high-resolution abnormality detection, the industrial system comprising:

a sensor that acquires information on an industrial device; and calculation means for performing calculation based on the information acquired by the sensor to detect an abnormality the industrial device of an industrial line, wherein the abnormality comprises one or more of a first event occurring in an industrial device of the industrial line, a second event occurring on the industrial line, an indication the first event or the second event, and a threshold value for a difference between predetermined movements of the industrial line during the operation or the industrial device and a simulation, wherein the sensor acquires information on a movable part of the industrial device, the information including one or more among position information, speed information, and acceleration information of the movable part, during operation of the industrial device, and wherein the calculation means compares the information on the movable part acquired by the sensor with information on a virtual movable part obtained through the simulation for the industrial device, and outputs a result comprising a graph for display, the graph superimposing the simulation and the information on the movable part to show the abnormality between the simulation and the movable part.

5. The industrial system according to claim 4, wherein the simulation is performed based on design data used for designing the industrial device.

6. The industrial system according to claim 4, wherein when there is a deviation exceeding a predetermined range for a movement time of the movable part, as a result of comparing information of the movable part acquired by the sensor with information of the virtual movable part, the calculation means outputs a warning.

7. The industrial system according to claim 4, wherein the sensor acquires the information by identifying a vicinity of a tip of the movable part.

8. The industrial system according to claim 4, wherein the sensor is imaging means, and acquires the information by identifying a marker attached to the movable part.

9. The industrial system according to claim 4, wherein the industrial device configures at least part of a manufacturing line, and the simulation is a simulation using computer-aided design data at a time of designing the manufacturing line.

10. The industrial system according to claim 4, wherein the calculation means compares by reading simulation result data indicating information of the virtual movable part from a predetermined storage unit, and the simulation result data in the storage unit is updated when a design change is made to movement of the industrial device or the industrial device.

11. The industrial system according to claim 4, wherein a plurality of the industrial devices are provided in the industrial line, and the calculation means executes a simulation of a series of processes by the plurality of industrial devices, and compares data based on a measurement result of a sensor installed in the industrial line with data based on a result of the simulation of the series of processes, and outputs a comparison result.

12. The industrial system according to claim 4, wherein a plurality of the industrial devices are provided in an industrial line, and the calculation means compares data indicating a result of simulation of the industrial line with data based on a measurement result of a sensor installed in the industrial line, and detects movement of a component of the industrial line that is a cause when it is determined to be abnormal.

13. An abnormality detection system for line operation support and high-resolution abnormality detection, the abnormality detection system comprising:

a storage unit that stores design data used when constructing an industrial line including a plurality of processes;

a simulation execution unit that executes a simulation of movement of the industrial line, based on the design data;

a detection unit that compares a relationship between a plurality of virtual processes in a result of the simulation and a relationship between the plurality of processes during operation of the industrial line, and detects an abnormality in the industrial line, wherein the abnormality comprises one or more of a first event occurring in an industrial device of the industrial line, a second event occurring on the industrial line, an indication the first event or the second event, and a threshold value for a difference between predetermined movements of the industrial line during the operation or the industrial device and the simulation; and a calculation unit that generates and outputs a graph for display, the graph superimposing the simulation and the predetermined movements to show the abnormality between the simulation and the predetermined movements.

14. An abnormality detection method for line operation support and high-resolution abnormality detection, the abnormality detection method comprising:

executing a simulation of movement of an industrial line based on design data used when constructing the industrial line;

acquiring information indicating movement during operation of the industrial line; and comparing a result of the simulation with movement of the industrial line during operation and detecting an abnormality in components of the industrial line wherein the abnormality comprises one or more of a first event occurring in an industrial device of the industrial line, a second event occurring on the industrial line, an indication the first event or the second event, and a threshold value for a difference between predetermined movements of the industrial line during the operation or the industrial device and the simulation; and generates and outputs a graph for display, the graph superimposing the simulation and the predetermined movements to show the abnormality between the simulation and the predetermined movements.

15. An abnormality detection method for line operation support and high-resolution abnormality detection, the abnormality detection method comprising:

creating a simulation model based on design data indicating required requirements for an industrial line;

performing a simulation with the simulation model;

storing result data indicating a result of the simulation;

acquiring movement during operation in an industrial line constructed based on the result of the simulation; and comparing the result data with movement during operation of the industrial line and detecting an abnormality in components of the industrial line, wherein the abnormality comprises one or more of a first event occurring in an industrial device of the industrial line, a second event occurring on the industrial line, an indication the first event or the second event, and a threshold value for a difference between predetermined movements of the industrial line during the operation or the industrial device and the simulation.

16. The abnormality detection method according to claim 15, further comprising:

re-executing the simulation and updating the result data according to a change in a configuration of the industrial line; and detecting an abnormality in a component of the industrial line by comparing result data resulting from the updating with movement of the industrial line in which the configuration is changed during operation.

* * * * *